United States Patent [19]

Esser

[11] Patent Number: 4,648,534
[45] Date of Patent: Mar. 10, 1987

[54] DEVICE FOR DISPENSING LIQUIDS

[76] Inventor: Gerhard Esser, Am Herzleiterbach 8, D-5330 Königswinter 41, Fed. Rep. of Germany

[21] Appl. No.: 708,585

[22] Filed: Mar. 5, 1985

[51] Int. Cl.⁴ .................... B67D 5/06; F16K 31/56
[52] U.S. Cl. ................................ 222/373; 222/380; 222/498; 222/505; 222/511; 251/253
[58] Field of Search ............ 222/373, 380, 382, 400.8, 222/499, 498, 509, 518, 545, 559, 505, 549, 401, 405, 513, 514, 516, 519–520, 522, 523, 525, 511; 251/257, 252, 253, 264

[56] References Cited

U.S. PATENT DOCUMENTS

| 578,094 | 3/1897 | Corbion, Jr. | 215/5 |
| 851,487 | 4/1907 | Bergmann | 251/321 |
| 1,066,820 | 7/1913 | Kelly | 251/252 X |
| 1,484,740 | 2/1924 | Rubino | 251/264 |
| 2,165,605 | 7/1939 | Baker | 225/3 |
| 2,312,067 | 2/1943 | Bates | 222/400.8 X |
| 3,127,786 | 4/1964 | Wooley | 251/253 X |
| 3,347,424 | 10/1967 | Boris | 222/400.8 X |
| 4,011,889 | 3/1977 | Smith | 137/614.11 |

FOREIGN PATENT DOCUMENTS

| 10925 | 2/1908 | Austria . | |
| 868264 | 7/1949 | Fed. Rep. of Germany . | |
| 2645461 | 2/1978 | Fed. Rep. of Germany | 222/380 |
| 3006416 | 9/1980 | Fed. Rep. of Germany . | |
| 3238558 | 4/1984 | Fed. Rep. of Germany . | |
| 322547 | 6/1902 | France . | |
| 1381391 | 1/1975 | United Kingdom . | |

Primary Examiner—F. J. Bartuska
Assistant Examiner—Nils Pedersen
Attorney, Agent, or Firm—Bernard, Rothwell & Brown

[57] ABSTRACT

The valve for dispensing liquids which contain or are free from gas, more especially drinks containing carbon dioxide, from containers, comprises a housing with a socket which can be fitted on to the container opening, a riser duct which opens into the socket and to which is connected a riser extending into the container, a dispensing duct which extends to the lateral face of the housing and is connected to said riser duct, and a valve member which is displaceable in a bore between a closed position and an open position. According to the invention the device is characterized in that the bore has rotatably arranged therein a cam carrier which partially encloses the valve member and of which the cam or cams cooperating with at least one pin of the valve member have a pitch region, the pin or pins are held by spring force in abutment with the cam or cams of the cam carrier, pin support bearings are provided in the pin position at the upper end of the pitch region and the valve member, with support of its pins on the pin support bearing, is axially fixed and, with release of its pins from the pin support bearing, is axially displaceable. When a gas-pressurized liquid is dispensed by this device, the release of the dissolved gas and thus the formation of froth is avoided.

16 Claims, 12 Drawing Figures

DEVICE FOR DISPENSING LIQUIDS

BACKGROUND OF THE INVENTION

The invention relates to a device for dispensing liquids which contain or are free from gas, more especially drinks or beverages containing carbon dioxide, from containers, more especially bottles.

The known dispensers for liquids are only suitable either for liquids containing gas or for liquids which are free from gas and are connected to the container which contains the liquid. Consequently, it is not possible for them to be transferred in a simple manner from one container, for example a bottle with a screwthread on the bottle neck, to another container.

A dispensing device has been proposed in the German Offenlegungsschrift No. 32 38 558.7, which device is combined with an air pump and consequently is equally suitable for dispensing liquids which contain gas or are free from gas. More especially it is possible for gas-containing liquids, e.g. drinks containing carbon dioxide, to be drawn off substantially completely from relatively large containers, for example 2-liter bottles, because it is possible, with an insufficient carbon dioxide pressure in the substantially emptied container, always to produce a sufficient propellant gas pressure for drawing off the liquid by pumping in air. On the other hand, it has been found in practice that, with the dispensing of beverages or drinks containing carbon dioxide and/or sugar, the shut-off valve does not sufficiently conform to the requirements as regards froth-free tapping, high carbon dioxide content also in the last drink quantities tapped from the container, and easy operability. The opening movement of the valve member is carried out manually and consequently is comparatively slow. The liquid, super-saturated with carbon dioxide, consequently flows with the initiation of the opening of the valve through a narrow valve gap behind which occurs a relief of pressure. As long as the clearance of the shut-off valve is still small, turbulence occurs in the clearance or gap and on the downstream side thereof, such turbulence leading to the formation of froth and splashing or spilling of the liquid to be drawn off. Furthermore, it was found that the surface seals on valve members have a tendency to sticking, as a result of which the functioning of such valves is impaired.

A faucet having a sleeve which surrounds the valve member is known from Austrian Patent Specification No. 10 925. The sleeve has a helical slot, through which the radial pin of the valve member projects outwardly into an axial groove of the valve housing. By rotating the sleeve, the valve member is moved from the closed position into the open position, and vice versa. In such an operation, the pin is guided without clearance in the slot, since the width of the slot is adapted to the diameter of the pin. The opening of the valve requires a manual rotation of the sleeve. It is not possible in this case for the valve to be opened so quickly that the formation of froth or foam of drinks containing $CO_2$ is avoided, on account of turbulence of the liquid at the small opening gap being initially formed.

The invention has for its object to provide a device which is suitable for the dispensing of gas-containing or gasfree liquids, more especially $CO_2$-containing drinks or beverages. The dispensing of gas-containing drinks is to be effected without loss of gas, i.e. without gas escaping from the container holding the liquid during the dispensing operation. More especially, as regards $CO_2$-containing drinks, the escape of dissolved carbon dioxide from the drink during the dispensing operation and thus the formation of froth during the passage through the dispenser, is to be avoided. The invention has for its particular object to provide a dispensing means or faucet of which the valve opens at a high speed, which is independent of the speed with which the user of the dispenser operates the latter, i.e. turns the tap, lever or the like. In addition, with liquids containing sugar, the operability of the shut-off valve is not to be impaired, even after relatively long intervals between use, and the sealing is to remain assured even after relatively long periods of use. Finally, the dispenser is to be able to be easily transferred from one container to another container and to be easily operated in the home also by technically unskilled persons.

SUMMARY OF THE INVENTION

The device for the dispensing of gas-containing or gas-free liquids, more especially $CO_2$-containing drinks or beverages, from containers, accordingly consists of a housing with a socket adapted to be put on the opening of the container, a riser duct which opens in said socket and to which is connected a riser extending into the container, a dispensing duct which extends laterally from the housing and which is connected to the riser duct, and a valve member which is displaceable in a bore between a closed position and an open position and is provided with at least one pin which projects from its surface and which engages in at least one guide groove which is formed in the bore in parallel with the bore axis.

With this device, the object according to the invention is achieved by the fact that a cam carrier partially enclosing the valve member is arranged to be rotable in the bore, of which cam carrier the cam or cams cooperating with at least one pin has or have a pitch region, the pin or pins of the valve member are held by spring force in abutment with the cam or cams of the cam carrier, pin support bearings are provided in the pin position at the upper end of the pitch region, and the valve member, with support of its pins at said pin support bearings is axially fixed and, with release of its pins from said pin support bearings, is capable of axial displacement.

With the rotation of the cam carrier, the valve member bearing with its pins on the cams is lifted against spring action along the pitch region, i.e. from its open position in which the liquid is able to flow through the ducts, into its closed position in which the passage of the liquid through the ducts is blocked. This displacement is effected without any rotation, since the pins of the valve member are guided in the guide grooves. When the pins, as a result of this displacement, reach the upper end of the pitch region, then as a result of further rotation of the cam carrier, they arrive at the pin support bearing, by which the valve member is supported axially against the spring force. In this axial position, the valve member is located in the closed position, i.e. the valve member, despite of the action of the spring force, remains in the closed position when its pins are supported in the pin support bearing. If the cam carrier is now rotated in such a manner that the valve member pins are freed from the pin support bearing, the valve member which is now displaceable axially is moved immediately by the force of the spring in the direction towards its open position. Depending on the construction embodiment of the device, the valve member is in this case able to be moved immediately into the open position, or it is able to execute only a part of the whole opening movement. In the latter case, the valve is suddenly only partially opened. The rotation of the cam carrier which is necessary for the freeing of the pins from the pin support bearing is able, depending on the embodiment, to be effected in the same direction of rotation as with the closure of the valve or in the direction of rotation which is opposite to that of the closing direction.

On accordance with the preferred embodiment of the device of the invention, the cam carrier comprises at least one shell component and the pin support bearing is a region of the cam or cams extending on the upper edge of the shell component, said region having substantially no pitch and adjoining the pitch region. With this embodiment the pins of the valve member, after leaving the pitch region, are supported in the following pitch-free region on the upper edge of the shell component, as a result of which the valve member is held against spring action in the closure position. At the end of the pitch-free region, the shell wall generally descends perpendicularly to the start of the following pitch region. With further rotation of the cam carrier, the consequence is that the valve member at the end of the pitch-free region is suddenly moved back by the spring force into ist initial position, i.e. into the open position. The stopping of the valve member in the closed position is obtained when its pins, in the pitch-free region, are supported on the upper edge of the wall of the shell component or components. No reversal of the direction of rotation of the cam carrier is necessary for opening the valve, that is to say, the cam carrier can always be rotated in the same direction, for example in the clockwise direction, open positions and closed positions following one another as often as desired. With this device, it is particularly advantageous for the valve member to be moved instantaneously from the closed position into the fully open position, i.e. the speed of opening of the valve member is independent of the speed of rotation of the cam carrier. With the opening of the valve, the inflowing liquid has instantaneously available the full valve cross-section, this being an essential prerequisite for avoiding gas release at the valve.

The cam carrier advantageously comprises two axially symmetrical shell sections carrying the cam or cams. The supporting of the valve member on the cam carrier is then effected, in this case, by two pins which are arranged diagonally relatively to one another, thereby avoiding a canting of the valve member in said carrier.

With this embodiment a step rising in the direction of rotation of the cam carrier is preferably formed in the substantially pitch-free region of the cam or cams. If the cam carrier is rotated still further, after the closed position of the valve member has been reached and the valve member pins in the pitch-free region are resting on the cams, the said pins come to a position before these steps. A further rotation of the cam carrier is only possible with the application of an increased torque, since the raising of the pins and of the valve member on to the steps is accompanied by a compression of the O-ring by which the cam carrier is sealed off against the outer threaded ring. The resistance caused by the steps with the rotation of the cam carrier consequently constitutes a certain arrest, since it is only possible to rotate the cam carrier into the end position after this resistance has been overcome, in which position the valve member pins leave the pitch-free region of the cams and the valve member is suddenly moved by the spring into its initial position, i.e. the open position.

With another embodiment of the device according to the invention, the cam carrier is of sleeve-like shape, the cam or cams is or are formed in the sleeve by at least one helical slot, the width of which is at least equal to the diameter of the pin of the valve member, and the pin supporting bearing is formed by guide groove sections which, at those ends of the guide grooves adjacent to the riser duct, join the guide grooves in the same circumferential direction of the bore. In this embodiment the pins of the valve member extend through the helical slots into the guide grooves. By rotation of the sleeve-shaped cam carrier, the valve member is displaced axially without any rotation until its pins have arrived at the upper ends of the slots. In this position, the pins are disposed before said guide groove sections extending in the circumferential direction, so that it is now possible for a limited rotation of the valve member to take place, the pins of the latter being able to enter into said guide groove sections serving as support bearings for said pins. With further rotation of the sleeve-shaped cam carrier, corresponding to the circumferential direction of the guide groove sections, the valve member is consequently carried along by the cam carrier, the pins being supported axially in the guide groove sections and the valve member being thus held in the closed position against the force of the spring. By rotation of the sleeve-shaped cam carrier in the opposite direction of rotation, the valve member is likewise carried along, as a result of which its pins are moved out of the guide groove sections extending in the circumferential direction. The valve member being under spring tension is consequently moved backwards suddenly by the force of the spring, i.e. in the direction towards the open position, when the pins have left said guide groove sections. The extent of this movement of the valve member is equal to the axial slot width. If it should be that the slot width is equal to the diameter of the pin, the instantaneous movement of the valve member, caused by the spring force is equal to zero, and the valve member has to be moved into the starting position, i.e. into the open position, by rotating the sleeve-shaped cam carrier. Preferably, the width of the slot or slots taken in parallel to the carrier axis amounts to a multiple of the pin diameter. When the pins are free from said guide groove sections extending in the circumferential direction, the valve member is instantaneously moved back by the axially parallel slot width from the closed position and, as a result, an only slight opening gap causing formation of froth is overcome.

With this embodiment the sleeve-shaped cam carrier is advantageously formed with two helical slots and the pins project through these slots into the guide grooves. As is the case with the aforementioned cam carrier having two axially symmetrical shell-like sections, it is possible, by the two slots arranged in opposition to one another, to achieve a uniform force transmission between cam carrier and valve member and to avoid a tilting of the valve member.

With both embodiments the valve member expediently has two pins arranged diagonally in relation to one another and the bore has two guide grooves which are diagonally opposite one another. The guide grooves are advantageously arranged in the horizontal plane of said bore. The device may also be provided with more than two, more especially with three peripherally disposed pins, guide grooves and shell sections or sleeve slots.

A helical tension spring is advantageously arranged between the valve member and the cam carrier. The tension spring holds the valve member with its pins in a bearing position against the cams of the cam carrier, so that, in the pitch region of the cams, each rotational position of the cam carrier is related to a displacement position of the valve member. A bore is advantageously formed in the valve member and/or the axial journal of the cam carrier, in which is contained the tension spring, so that the slide-in of the valve member into the shell-shaped or sleeve-shaped cam carrier is not impeded by the tension spring. At least one end of the tension spring, more especially that end of the spring projecting into said journal of the cam carrier, is rotatably suspended, so that with unidirectional rotation of the cam carrier the spring is not able to develop any torque in the opposite direction of rotation.

With another embodiment of the device according to the invention, a helical compression spring is arranged between the pins of the valve member and an annular shoulder of the bore. This compression spring has the same effect as the previously explained tension spring. The valve member is permanently pressed with its pins on to the cams of the cam carrier, and in the rotational position at the end of the substantially pitch-free region of the cams and at the outlet end of the guide groove sections, respectively, the valve member is suddenly moved into the shell-shaped or sleeve-shaped cam carrier, i.e. it is moved from the closed position into the direction towards the open position.

According to the preferred embodiment of the invention, the end face of the valve member is formed as a cylindrically or spherically curved concave surface for deflecting the flowing liquid from the riser duct into the dispensing duct. The liquid flowing upwardly through the riser duct is deflected horizontally into the dispensing duct by the steadily curved end face without any substantial turbulence. The tendency to release of gas and froth development of a liquid over-saturated with gas at the valve is hereby further reduced.

According to the preferred embodiment of the invention, the dispensing duct is partially conically constricted in the flow direction, and the surface of the cylindrical valve member is provided with an O-ring near to its end face, providing a sealing against the conical region of the dispensing duct. In contrast to a for example rubberised valve member providing a two-dimensional seal against a conical seat, what is formed here is a line seal which is insensitive to sticking by sugar-containing liquids. The term "line seal" which is chosen here obviously also covers two-dimensional seals of small width, which are formed by pressure deformation of the elastic O-ring in the conical region of the dispensing duct. Even with considerable sugar content of the liquid and repeated drying out of the valve, the sticking force will not become so strong that the spring force for the opening movement of the valve member is no longer sufficient.

A lever, rotatable knob or the like, projecting laterally from the housing, is preferably mounted on the axial journal of the cam carrier. If the cam carrier in accordance with the preferred embodiment of the invention carries two axially symmetrical shell-shaped parts, each with a cam, the valve member with turning of the lever through 180° makes a full stroke from the open position to the closed position and, at the end of this angle of rotation, springs back again into the open position.

The housing is advantageously equipped with a pump, the pressure chamber of which is connected by a duct provided with a valve to the interior of the socket. By means of the dispensing head equipped with this air pump, it is possible to dispense liquids from a container which do not generate a propellant gas pressure, as for example drinks or beverages with a low content of or free from carbon dioxide. For this purpose, with the aid of the pump, an air pressure is generated in the liquid-free space of the container which pressure is sufficient for conveying the liquid through the riser and the dispensing head. This device is consequently capable of more versatile use than a dispensing head without an air pump.

BRIEF DESCRIPTION OF THE DRAWINGS

The invention is hereinafter more fully described by reference to the drawing, wherein.

DETAILED DESCRIPTION OF THE PREFERRED EMBODIMENTS

Figure 1:
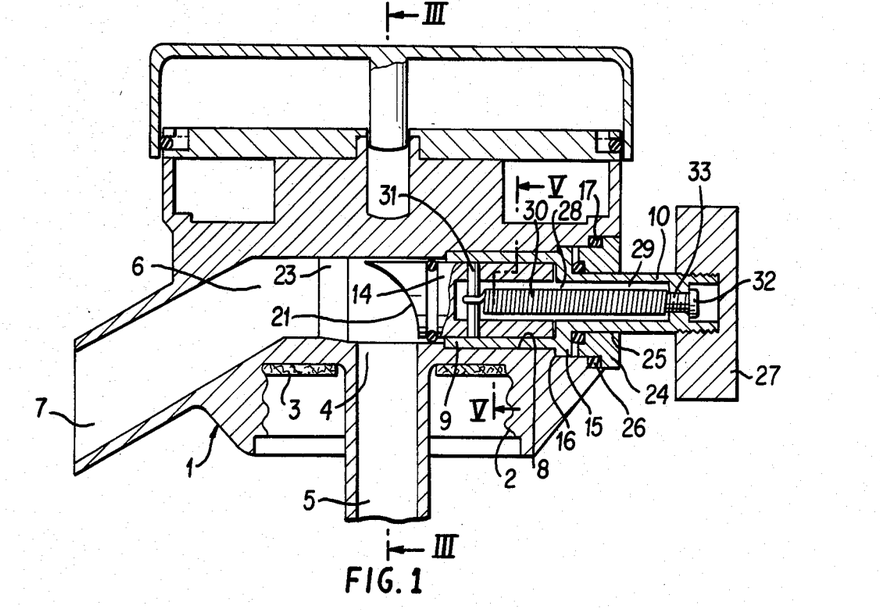
FIG. 1 shows a first embodiment of the dispenser with the shut-off valve open and in axial section.
Figure 2:
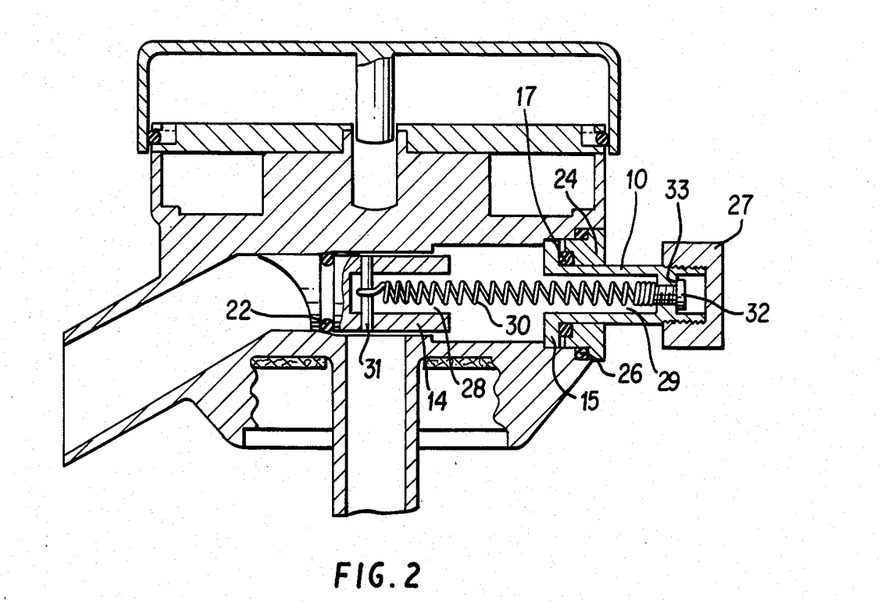
FIG. 2 is the same view as in FIG. 1, but with the shutt-off valve closed.

According to FIGS. 1 and 2 the dispenser consists of a housing 1 with an internally threaded socket 2, with which it is possible for the device to be screwed, for example, on to the threaded opening of a drink container, for example a bottle, a packing disk 3 ensuring the sealing. The device has a riser duct 4 with associated riser 5 extending into the container (not shown). The housing 1 also contains a horizontal dispensing duct 6 which terminates in a downwardly sloping socket 7.

Also formed in the housing 1 is a cylindrical bore 8, the axis of which lies in the same plane with the axes of the riser duct 4 and of the dispensing duct 6 and which opens to the side of the housing. Fitted so as to be rotatable into the bore 8 is a cam carrier 9 which carries at its rearward end a journal 10 (see also FIG. 4) which projects from the housing 1. The cylindrical bore 8 is formed with two axially parallel guide grooves 11 which are arranged diametrically facing one another, said grooves extending substantially over the full length of the bore 8 and being disposed in the horizontal plane of the bore (see FIG. 5).

Figures 4, 5:
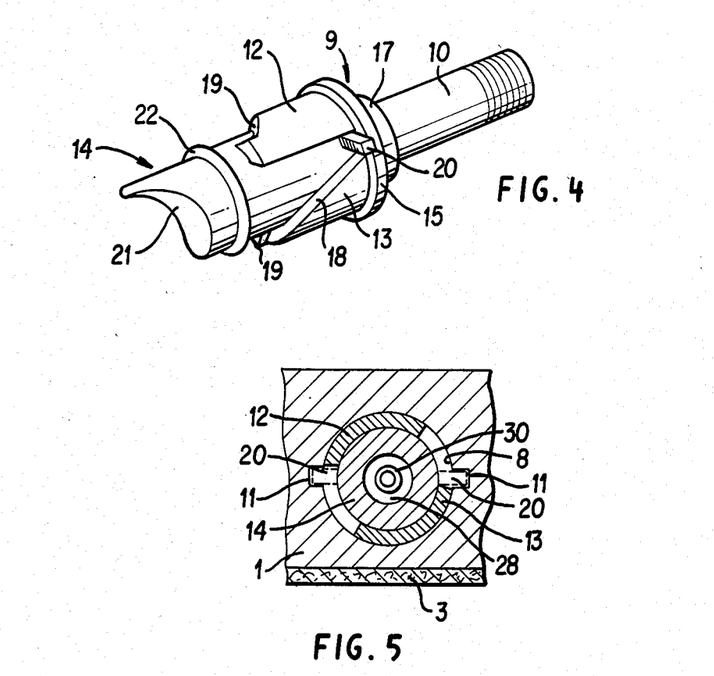
FIG. 4 is a perspective view of the cam carrier with the valve member pushed into the latter.
FIG. 5 is a section on the line V—V of FIG. 1.

As may be more particularly seen from FIG. 4, the cam carrier 9 has two shell-like parts 12,13 of hollow cylindrical segmental form which are arranged axially symmetrically of one another and into which is pushed the valve member 14 in its closure position shown in FIG. 4. The cam carrier 9 also comprises a collar 15, which abuts an annular shoulder 16 of the bore 8, and also a journal 10, which carries an O-ring 17. The cams formed by the top edges of the shell-shaped portions 12 and 13 comprise a pitch region 18 and a region 19 having substantially no pitch.

The valve member 14, which is displaceable axially in the shell-shaped parts 12, 13 of the cam carrier 9, carries at its rearward end and in a diagonal arrangement two radially projecting pins 20 which cooperate with the cams 18,19, as will hereafter be more fully described. The pins 20 engage in the diametrically facing guide grooves 11 of the bore 8 (FIG. 5) so that it is ensured that the axial displacement of the valve member 14 is effected without any rotation. The end face of the valve member 14 is formed as a cylindrically curved guide surface 21 which, in the open position shown in FIG. 1 deflects the liquid flowing in the riser duct 4 into the horizontal dispensing duct 6 without any substantial turbulence. At a small distance from the end face 21, the valve member 14 carries an O-ring 22 which, in the closed position shown in FIG. 2, seals off the valve member 14 against the conical region 23 of the dispensing duct 6.

Screwed into the bore 8 is a threaded ring 24 having a bore 25, the journal 10 projecting outwardly through the bore 25. The threaded ring 24 is sealed off against the housing 1 by an O-ring 26 and against the cam carrier 9 by the O-ring 17. The outwardly projecting journal 10 has a screwthread at its outer end and has fixed thereon a lever 27, so that by rotation of this lever the cam carrier 9 which is substantially fixed axially in the bore 8 can be rotated.

As can be seen from FIGS. 1,2 and 5, the valve member 14 and the journal 10 of the cam carrier 9 contain axial bores 28 and 29, respectively. Secured in the bore 28 by means of a pin 31 is the one end of a helical tension spring 30. The other end of the spring 30 is suspended for rotatable movement on an annular shoulder 33 of the bore 29 by means of a screw 32. The spring 30 exerts a tensile force on the valve member 14 so that its pins 20 are held so as to bear permanently on the cams 18,19.

Figure 6:
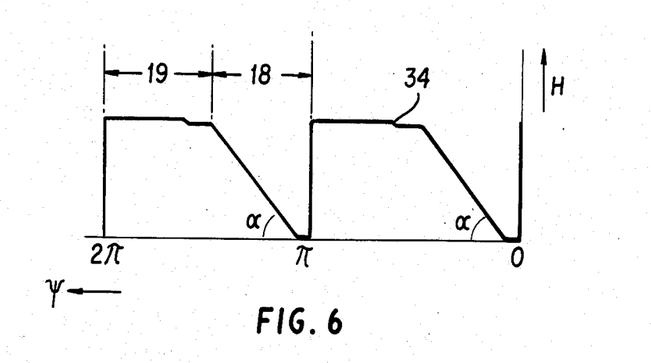
FIG. 6 shows the development of the curves of the cam carrier which is shown in FIG. 4.

If the lever 27 connected to the cam carrier 9 is rotated clockwise, the pins 20 are moved on the pitch regions 18 of the cams, the valve member 14 being moved forwardly from the open position into the closed position. At the forward end of the shell-like parts 12, 13, and with further rotation of the cam carrier 9, the pins 20 come to the pitch-free cam regions 19, as a result of which the valve member 14 remains in the closed position. As can be seen from FIG. 4 and the development of the cam carrier shells shown in FIG. 6, the pitch-free region 19 has a sloped step 34 (with a height of, for example 0.2 mm.) which, with the rotation of the lever 27, becomes sensible by an increased resistance to the turning movement, since the consequence of overcoming the step is a corresponding slight compression of the O-ring 17. The resistance caused by the step 34 results in a certain arresting effect, since it is only after the resistance has been overcome that the lever 27 is able to be rotated into the position at the end of the pitch-free region 19, in which the valve member 14 is suddenly returned into the open position. FIG. 6 shows the stroke H of the valve member in dependence on the rotation $\Psi$ of the cam carrier 9 with two axially symmetrical shell-like parts, such as that shown in FIG. 4. As will be seen from FIG. 6, a movement period of the valve member from open position to open position is obtained with one half rotation of the lever, i.e. after rotation through the arc $\pi$. The pitch angle $\alpha$ in the region 18 is for example 54°.

Figure 3:
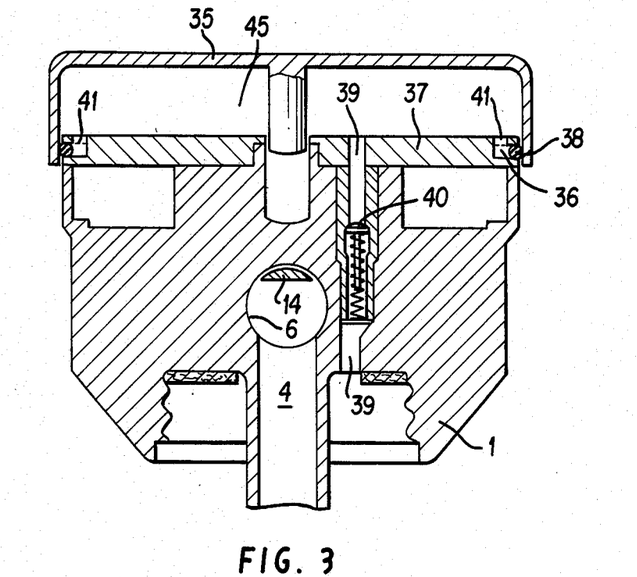
FIG. 3 is a section on the line III—III of FIG. 1.

According to FIGS. 1 to 3, the housing 1 carries on its top side an axially guided cylinder 35, the wall of which coacts with an O-ring 38 floatingly arranged in the annular groove 36 of the disc 37. The disc 37 and the housing 1 have a bore 39 which opens into the socket 2 and in which is arranged a spring-loaded valve 40. The groove 36 is connected by way of a plurality of bores 41 to the pressure chamber 45 of the cylinder 35. The operation of this air pump which is known per se is that, with the pressing down of the cylinder 35, the air flowing into the annular groove 36 forces the O-ring 38 against the side wall of the cylinder and in this way produces the sealing of the pressure chamber 45 between the cylinder wall and the disc 37. As a consequence, the air is pressed through the bore 39 and the valve 40 into the container on which the dispenser is mounted. With the upward movement of the cylinder 35, the O-ring 38 is drawn inwardly in the annular groove 36 by the vacuum in the cylinder, so that the seal between the cylinder wall and the disc 37 is broken and air can flow into the pressure chamber 45.

Figure 7:
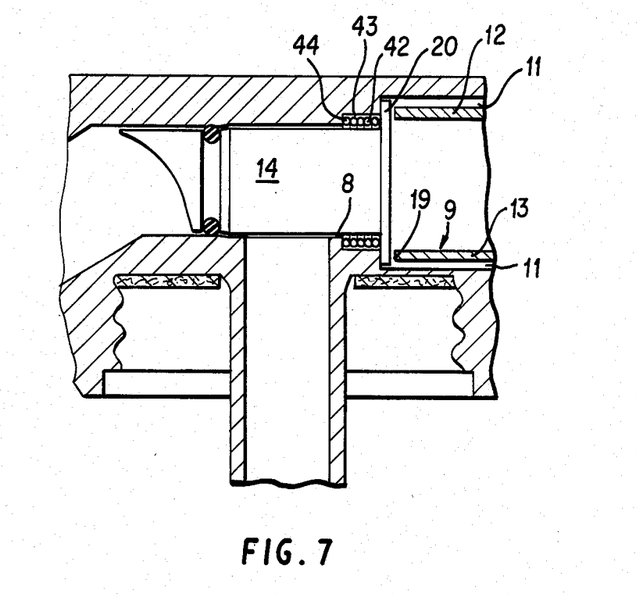
FIG. 7 is a partial view of a second embodiment of the dispenser in an axial section.

FIG. 7 shows an embodiment in which the valve member 14 is surrounded by a helical compression spring 42, which is arranged in an annular space 43 between the pins 20 and an annular shoulder 44 of the bore 8. In the same manner as the tension spring 30 in the embodiment shown in FIGS. 1 to 3, the compression spring 42 holds the pins in abutment against the cams 18, 19 of the cam carrier 9, so that the movement of the valve member 14 responds to the rotational angle-stroke-diagram which is prescribed by the cams. With a position of the valve member 14 differing from the closure position shown in FIG. 7, and with the valve partially or completely opened, the helical compression spring 42 lies partially in the annular gap between the valve member 14 and the shell-shaped parts 12,13. Apart from the fact that the guide grooves 11 for the valve member pins 20 are arranged one above the other in the vertical axial plane of the bore 8, there are no essential differences in comparison with the embodiment according to FIGS. 1 to 3.

Figure 8:
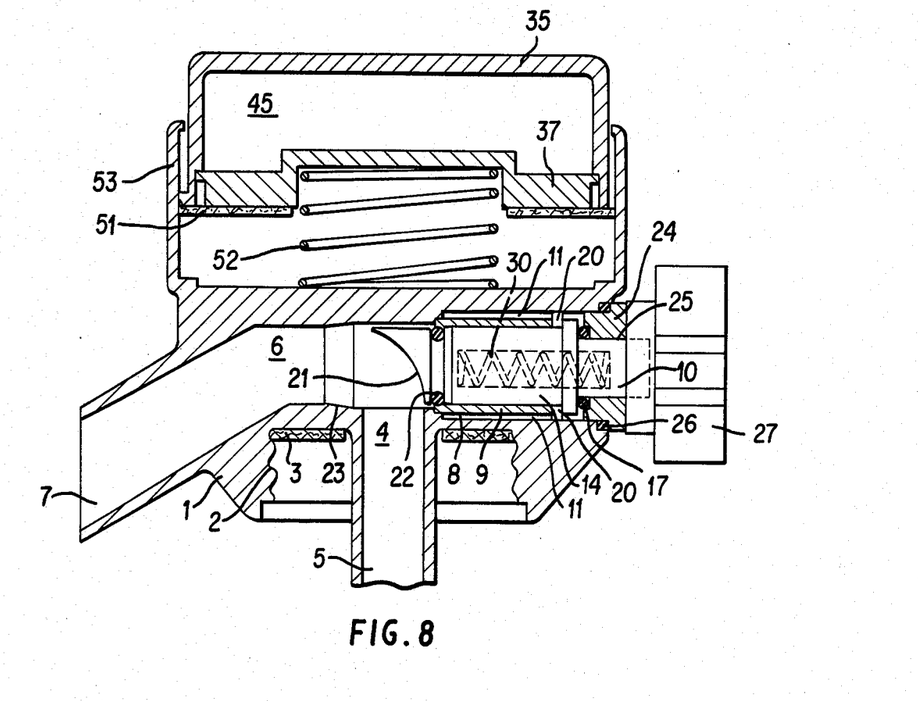
FIG. 8 shows a third embodiment of the dispenser with the shut-off valve open and in axial section.
Figure 9:
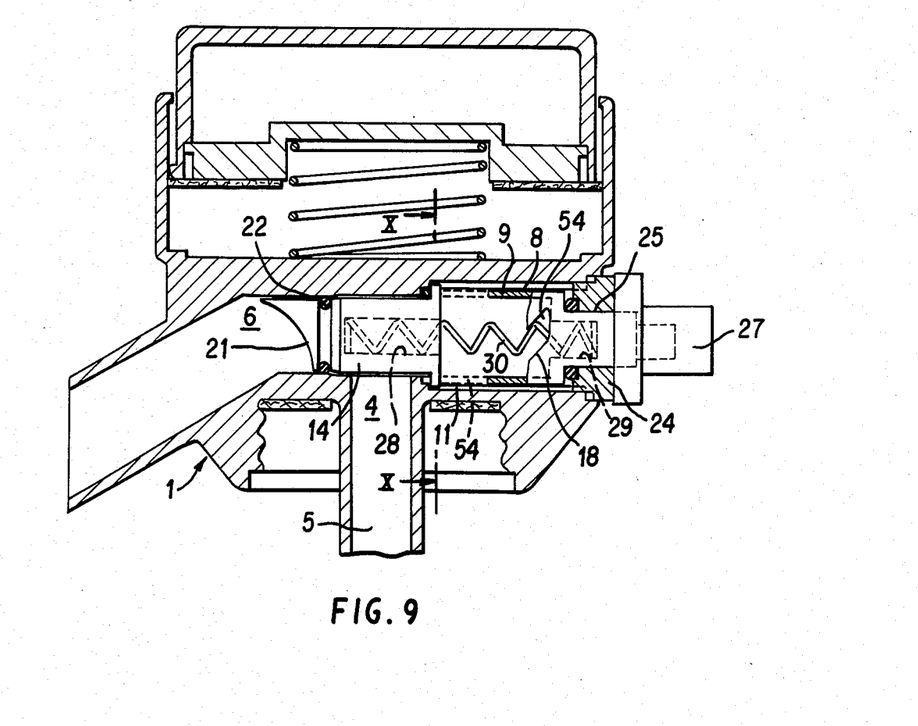
FIG. 9 is the same view as in FIG. 8, but with the shutt-off valve closed.

The embodiment of the dispenser which is illustrated in the FIGS. 8 and 9 consists of a housing 1 with an internally threaded socket 2, by which the dispenser can for example be screwed on to the threaded opening of a beverage container, for example a bottle, a sealing disc or washer 3 guaranteeing the sealing effect. The dispenser is provided centrally of the socket 2 with a riser duct 4, at which is formed a riser 5 extending into the container. The housing 1 also contains a horizontal dispensing duct 6 which ends in a downwardly sloping dispensing pipe 7.

Figure 11:
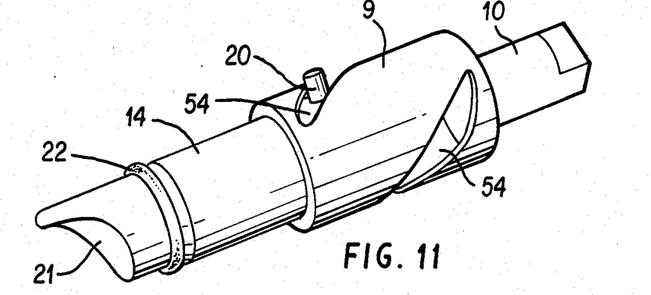
FIG. 11 is a perspective view of the cam carrier with valve member, as used in the embodiment according to FIG. 8.

Provided in the housing 1 is a cylindrical bore 8, the axis of which lies in the same plane as the axes of the riser duct 4 and the dispensing duct 6 and which opens laterally from the housing 1. Fitted for rotatable movement into the bore 8, which is provided at the outer end with a screwthread, is a sleeve 9 which is provided at the outer end with a journal 10 (see also FIG. 11) projecting from the housing. In addition, the sleeve 9 is provided with two helical slots 54 turning in the same rotary direction. The cylindrical bore 8 is provided with diametrically facing, axially parallel guide grooves 11 which extend over substantially the full length of the bore 8. Displaceable in the sleeve-shaped cam carrier 9 is a cylindrical valve member 14 which carries at its rearward end two radially projecting pins 20 which are diametrically opposite one another and which pass through the two slots 54 into the axially parallel guide grooves 11 and thereby assure that the valve member 14 is displaceable axially, but is not rotatable with the axial displacement as long as the pins 20 are guided in the guide grooves 11. The inner end face 21 of the valve member 14 is formed as a cylindrically curved guide surface which, in the open position shown in FIG. 8, deflects the liquid rising in the duct 4 without any substantial turbulence into the horizontal dispensing duct 6. At a small distance from the end face 21, the valve member 14 carries a packing ring 22 which, in the closed position shown in FIG. 9, seals off the valve member 14 against the conical region 23 (FIG. 8) of the dispensing duct 6.

The bore 8 is screwed by a threaded ring 24 having a bore 25 the journal 10 projecting outwardly through the bore 25. A packing ring 26 is provided for sealing off the threaded ring 24 relatively to the housing 1, and a packing ring 17 is provided for sealing it off relatively to the cam carrier 9. The outwardly projecting journal 10 has a screw-threaded connection with a lever 27 so that it is possible, by turning said lever, to rotate the sleeve 9 which is fixed axially in the cylindrical bore 8. Since the pins 20 of the valve member 14 engage through the helical slots 54 into the axially parallel guide grooves 11, the pins 20, by the rotation of the journal, are displaced in the slots 54 and thus also in the guide grooves 11, i.e. the valve member 14 can be moved axially between the open position which is shown in FIG. 8 and the closed position which is shown in FIG. 9.

Figure 10:
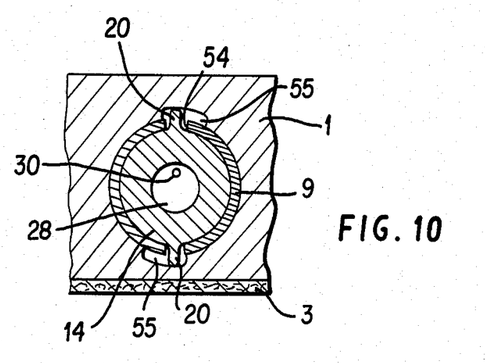
FIG. 10 is a section on the line X—X of FIG. 9.

At their inner ends the guide grooves 11 have short guide groove sections 55 extending circumferentially of the bore 8, as can be seen from FIG. 10. Consequently, the valve member 14, in the closed position (FIG. 9), in which the pins 20 have arrived at the front ends of the guide grooves 11, is able to be rotated by means of the lever 27 through an angle corresponding to the arcuate length of the guide groove sections 55, as a result of which the valve member 14 is locked in the closed position. It is only after the sleeve 9 has been rotated back into the unlocked position shown in FIG. 10 that the valve member 14 can be moved back into the open position from the closed position shown in FIG. 9.

As will be apparent from FIGS. 8 to 10, the valve member 14 and the journal 10 of the sleeve 9 contain axial bores 28 and 29, respectively, into which a tension spring 30 is fitted. It can be seen from FIGS. 9 and 11 that the helical slots 54, in the axially parallel direction, have a width which is substantially larger than the diameter of the pins 20. The consequence of this is that, after the freeing of the pins (FIG. 10), the valve member 14 is instantaneously retracted from the closed position by the axially parallel width of the slots 54 (FIG. 9). The shut-off valve is consequently partially opened in a very short time, as a consequence of which it is avoided that a considerable quantity of liquid flows through an initially narrow valve gap and as a consequence froth is developed.

Figure 12:
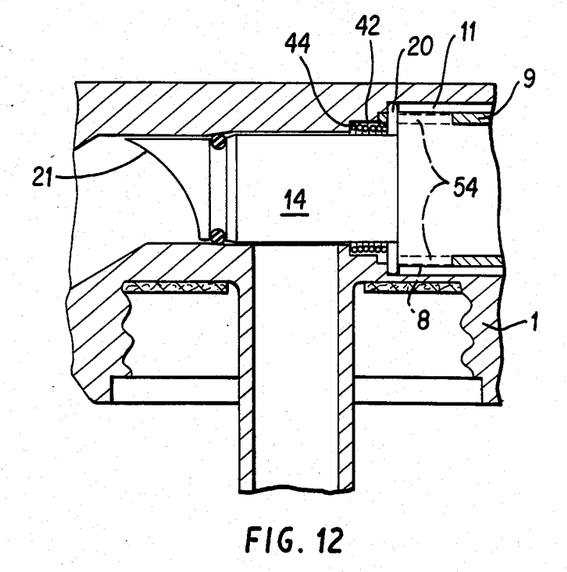
FIG. 12 shows a partial view of a fourth embodiment of the dispenser in axial section.

FIG. 12 shows an embodiment in which the valve member 14 is displaceable in the sleeve 9, leaving an annular gap, and a compression spring 42 is arranged in said gap. In the closed position which is shown, the spring 42 is inserted between the two pins 20 at one end and an annular shoulder 44 of the bore 8 at the other end. As soon as the valve member 14 is freed by rotation of the sleeve 9, the spring 42 acting on the pins 20 throws back the valve member 14 by the axially parallel width of the slots 54, and the valve opens suddenly. This instantaneous opening stroke is in this case sufficient for opening a flow cross-section of the valve which avoids the release of gas from the liquid.

According to FIGS. 8 and 9, the housing 1 carries on its upper side a cylinder 53 which, in combination with the piston 37 forms a piston pump. The piston 37 is sealed off against the cylinder by the packing disc 51. As with the embodiment according to FIG. 3, the housing 1 has a bore into which a spring-loaded non-return valve is fitted (not shown). By pressing down the housing cover 35 connected to the piston 37 against the force of the spring 52, air is pressed through the non-return valve into the interior of the threaded socket 2, i.e. into the gas-filled space of the container, on to which the dispenser is screwed.

The dispenser which has been described is not only suitable for dispensing gas-containing liquids, more especially drinks containing carbon dioxide, which spontaneously generate an adequate propellant gas pressure in the container. With the aid of the arrangement 35–41 (FIG. 3) or respectively 35,37,45,51–53 (FIG. 8), also liquids which have a low gas content or are gas-free, e.g. drinks not containing carbon dioxide, are able to be sufficiently pressurized so that they can be dispensed by the apparatus according to the invention in a similar manner to liquids over-saturated with carbon dioxide. However, the invention is not limited to the embodiments which have been illustrated; it also covers dispensing devices without the means for the generation of a propellant air pressure in the container, which then are only suitable for the dispensing of liquids generating themselves an adequate natural gas pressure. Furthermore, the cam carrier can for example comprise more than two shell-shaped parts or slots, respectively, and the shape of the cams can be modified.

It is claimed:

1. A device for dispensing liquids which contain or are free from gas, more especially drinks containing carbon dioxide, from a container, comprising a housing with a socket which can be fitted on to the container opening, a riser duct in said housing which opens into the socket and to which is connected a riser extending into the container, a dispensing duct in said housing which extends to a lateral face of the housing and is connected to said riser duct, a valve member which is displaceable in a bore of said housing between a closed position and an open position and which has at least one laterally projecting pin and a steadily curved end face deflecting said liquid from the riser duct into the dispensing duct when the valve member is in an open position, a cam carrier which partially encloses said valve member and is arranged to be rotatable in said bore far displacing said valve member, at least one cam which is formed on said cam carrier and has a pitch region, said at least one pin of the valve member being held by spring force in abutment with said at least one cam, and a pin support bearing for said at least one pin, said pin support bearing being provided in a pin position at an upper end of said pitch region, said valve member being axially fixed with support of its pin at said pin support bearing and being capable of axial displacement with release of its pin from said pin support bearing.

2. The device in accordance with claim 1, wherein the cam carrier comprises at least one shell component and the pin support bearing is a substantially pitch-free region of the cam extending along an upper edge of the shell component, said pitch-free region being adjacent to the pitch region.

3. The device in accordance with claim 1, wherein said valve member further includes a second laterally projecting pin projecting diagonally of said at least one pin, the device further including a second cam for said second pin, which second cam corresponds to said at least one cam, wherein the cam carrier comprises two axially symmetrical shell components which carry the cams.

4. The device in accordance with claim 2, wherein a step rising in the direction of rotation of the cam carrier is formed in the substantially pitch-free region of the cam.

5. The device in accordance with claim 1, wherein the valve member comprises two pins arranged diagonally of one another and the bore has two guide grooves which are diagonally opposite one another.

6. The device in accordance with claim 1, wherein a helical tension spring is arranged between the valve member and the cam carrier.

7. The device in accordance with claim 1, wherein said valve member has a cylindrical surface and wherein the dispensing duct is partially formed with a conical tapering constricted in the flow direction, and the cylindrical surface of the valve member is provided near an end face thereof with an O-ring providing a seal against the conical region of the dispensing duct.

8. The device in accordance with claim 1, wherein the housing is fitted with a pump having a pressure chamber which is connected to the interior of the socket by way of a passage fitted with a valve.

9. A device for dispensing liquids which contain or are free from gas, more especially drinks containing carbon dioxide, from a container, comprising
   a housing with a socket which can be fitted on to the container opening,
   a riser duct in said housing which opens into the socket and to which is connected a riser extending into the container,
   a dispensing duct in said housing which extends to a lateral face of the housing and is connected to said riser duct,
   a valve member which is displaceable in a bore of said housing between a closed position and an open position and which has at least one laterally projecting pin,
   a guide groove extending along said bore for guiding said at least one pin,
   a cam carrier which partially encloses said valve member and is arranged to be rotatable in said bore,
   at least one cam which is formed on said cam carrier and has a pitch region, said at least one pin of the valve member being held by spring force in abutment with said at least one cam, and
   a pin support bearing for said at least one pin, said pin support bearing being provided in a pin position at an upper end of said pitch region, said valve member being axially fixed with support of its pin at said pin support bearing and being capable of axial displacement with release of its pin from said pin support bearing;
   wherein the cam carrier is of sleeve-like shape, the cam is formed by at least one helical slot in the sleeve, the width of the slot is at least equal to the diameter of the pin, and the pin support bearing is formed by a guide groove section extending peripherally along said bore, said section joining the guide groove at an end of the guide groove adjacent to the riser duct.

10. The device in accordance with claim 9, wherein the axial parallel width of the slot is a multiple of the diameter of the pin.

11. The device in accordance with claim 9, wherein said valve member further includes a second laterally projecting pin projecting diagonally of said at least one pin, and wherein the sleeve-shaped cam carrier is formed with two helical slots and the pins project through the slots into the guide grooves.

12. A device for dispensing liquids which contain or are free from gas, more especially drinks containing carbon dioxide, from a container, comprising
   a housing with a socket which can be fitted on to the container opening,
   a riser duct in said housing which opens into the socket and to which is connected a riser extending into the container,
   a dispensing duct in said housing which extends to a lateral face of the housing and is connected to said riser duct,
   a valve member which is displaceable in a bore of said housing between a closed position and an open position and which has at least one laterally projecting pin,
   a cam carrier which partially encloses said valve member and is arranged to be rotatable in said bore,
   a helical tension spring arranged between the valve member and the cam carrier,
   at least one cam which is formed on said cam carrier and has a pitch region, said at least one pin of the valve member being held by spring force in abutment with said at least one cam, and
   a pin support bearing for said at least one pin, said pin support bearing being provided in a pin position at an upper end of said pitch region, said valve member being axially fixed with support of its pin at said pin support bearing and being capable of axial displacement with release of its pin from said pin support bearing; wherein the cam carrier is provided with an axial journal, and bores are formed in the valve member and in the journal in which bores is contained the tension spring.

13. The device in accordance with claim 12, wherein a lever projecting laterally from the housing is mounted on the axial journal of the cam carrier.

14. A device for dispensing liquids which contain or are free from gas, more especially drinks containing carbon dioxide, from a container, comprising
   a housing with a socket which can be fitted on to the container opening,
   a riser duct in said housing which opens into the socket and to which is connected a riser extending into the container,
   a dispensing duct in said housing which extends to a lateral face of the housing and is connected to said riser duct, a valve member which is displaceable in a bore of said housing between a closed position and an open position and which has at least one laterally projecting pin, a cam carrier which partially encloses said valve member and is arranged to be rotatable in said bore, at least one cam which is formed on said cam carrier and has a pitch region, said at least one pin of the valve member being held by spring force in abutment with said at least one cam, and a pin support bearing for said at least one pin, said pin support bearing being provided in a pin position at an upper end of said pitch region, said valve member being axially fixed with support of its pin at said pin support bearing and being capable of axial displacement with release of its pin from said pin support bearing; wherein a helical compression spring is arranged between the pin of the valve member and an annular shoulder of the bore.

15. A device for dispensing liquids which contain or are free from gas, more especially drinks containing carbon dioxide, from a container, comprising a housing with a socket which can be fitted on to the container opening, a riser duct in said housing which opens into the socket and to which is connected a riser extending into the container, a dispensing duct in said housing which extends to a lateral face of the housing and is connected to said riser duct, a valve member having a longitudinal axis, which is longitudinally displaceable between a closed position and an open position in a bore of said housing along a longitudinal axis of said bore, the valve member having at least one laterally projecting pin, a cam carrier on which is formed at least one cam having a pitch region, said at least one pin of the valve member being held by a spring in abutment with said at least one cam, the cam carrier partially enclosing said valve member, said cam carrier being rotatable in said bore for displacing said valve member, a pin support bearing for said at least one pin, said pin support bearing being provided in a pin position at an upper end of said pitch region, said valve member being axially fixed with support of its pin at said pin support bearing and being capable of axial displacement with release of its pin from said pin support bearing, and means for rotating said cam carrier to longitudinally displace said valve member between said closed and open positions in said bore and thereby operate the dispensing device.

16. A device for dispensing a liquid which contains or is free from gas, more especially a drink containing carbon dioxide, from a container, comprising a housing with a socket which can be fitted on to a container opening, a riser duct in said housing which opens into the socket and to which can be connected a riser extending into the container, a dispensing duct in said housing which extends to a lateral face of the housing and is connected to said riser duct, said dispensing duct being partially formed with a conical tapering constricted in the flow direction, a bore in said housing which has two guide grooves extending in its longitudinal direction, a valve member which is longitudinally displaceable between a closed position and an open position in said bore along its longitudinal axis, the valve member having two laterally projecting pins, a steadily curved end fact deflecting said liquid from the riser duct into the dispensing duct when the valve member is in its open position, and a cylindrical surface provided near to said end face with an O-ring providing a seal against said conical tapering of said dispensing duct, and a cam carrier of sleeve-like shape, the cam carrier carrying a cam which is formed by two helical slots in the carrier, the slots having a width equal to the diameter of said pins, said cam carrier partially enclosing said valve member with said pins projecting through said helical slots into said guide grooves, and being provided with an axial journal by which it can be rotated in said bore for displacing the valve member.

* * * * *